United States Patent
Young et al.

(10) Patent No.: US 8,180,213 B2
(45) Date of Patent: May 15, 2012

(54) METHODS AND SYSTEMS FOR OPTICAL FOCUSING USING NEGATIVE INDEX METAMATERIAL

(75) Inventors: Abram G. Young, Tucson, AZ (US); Delmar L. Barker, Tucson, AZ (US); William R Owens, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 530 days.

(21) Appl. No.: 12/407,132

(22) Filed: Mar. 19, 2009

(65) Prior Publication Data

US 2012/0091345 A1    Apr. 19, 2012

Related U.S. Application Data

(60) Provisional application No. 61/047,671, filed on Apr. 24, 2008.

(51) Int. Cl.
*G03B 3/00* (2006.01)
(52) U.S. Cl. ........................................ 396/103; 359/359
(58) Field of Classification Search .................. 396/103; 359/359
See application file for complete search history.

(56) References Cited

U.S. PATENT DOCUMENTS

| | | | |
|---|---|---|---|
| 3,971,939 A * | 7/1976 | Andressen | 250/339.05 |
| 6,859,114 B2 * | 2/2005 | Eleftheriades et al. | 333/156 |
| 7,218,285 B2 * | 5/2007 | Davis et al. | 343/754 |
| 7,499,221 B2 * | 3/2009 | Nishioka | 359/652 |
| 2004/0169616 A1 | 9/2004 | Schultz | |
| 2006/0028385 A1 * | 2/2006 | Davis et al. | 343/754 |
| 2007/0201149 A1 | 8/2007 | Nishioka | |
| 2008/0118104 A1 | 5/2008 | Ariyur | |
| 2010/0067091 A1 * | 3/2010 | Smith et al. | 359/278 |

OTHER PUBLICATIONS

Zhang et al. "Near-infrared double negative metamaterials," Optics Express 4922, vol. 13 No. 13, Jun. 27, 2005.
Vodo et al., "Focusing by planoconcave lens using negative refraction," Applied Physics Letters 86, 201108, 2005 American Institute of Physics, May 10, 2005.

* cited by examiner

*Primary Examiner* — Rochelle-Ann J Blackman
*Assistant Examiner* — Linda B Smith
(74) *Attorney, Agent, or Firm* — Lando & Anastasi, LLP

(57) ABSTRACT

In an embodiment of methods and systems for optical focusing for laser guided seekers using negative index metamaterial, the methods and systems comprise a light focusing system comprising: a lens comprising a negative index metamaterial to focus at least one selected wavelength while defocusing other wavelengths, and a sensor upon which the lens focuses the selected wavelength.

22 Claims, 5 Drawing Sheets

METHODS AND SYSTEMS FOR OPTICAL FOCUSING USING NEGATIVE INDEX METAMATERIAL

CROSS-REFERENCES TO RELATED APPLICATIONS

This application claims the benefit of U.S. Provisional Patent Application No. 61/047,671 filed Apr. 24, 2008, and incorporates the disclosure of that application by reference.

BACKGROUND OF INVENTION

Many devices currently exist that are designed to track a laser or other type of electromagnetic source. For example, a laser guided projectile, such as a missile, may incorporate a laser guided seeker to accurately intercept or "strike" a selected target. A laser designator first illuminates the selected target, which then allows the laser guided seeker to detect the selected target by reflected laser "light" from the illuminated selected target. The laser guided seekers generally operate by using an avalanche photodiode detector or other type of light sensor to covert an optical wavelength, i.e. the reflected laser light, into an electrical signal.

A problem that often arises is that the laser guided seekers may detect and track an object other than the illuminated selected target. For example, because of the large field of view that most laser guided seekers have, solar background from the sun may confuse or disorient the light sensor, and the projectile may "lock in" on the sun. Thus, instead of the projectile directing itself towards the illuminated selected target, the projectile will direct itself towards the sun. Moreover, countermeasures may be deployed to similarly confuse the light sensor, such as a flame, fire, flare, or other type of heat (electromagnetic radiation) source. These countermeasures may cause the projectile to lock in on the countermeasure instead of the selected target. A system to focus a desired wavelength, such as the reflected laser light, and defocus background radiation, such as countermeasures or sun light, is desired.

SUMMARY OF THE INVENTION

In various representative embodiments, the methods and systems for optical focusing negative index metamaterial may comprise a light focusing system comprising: a lens comprising a negative index metamaterial to focus at least one selected wavelength, and a sensor upon which the lens focuses the at least one selected wavelength. Other non-selected wavelengths may be defocused before reaching the sensor

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DETAILED DESCRIPTION OF EXEMPLARY EMBODIMENTS

The present invention may be described in terms of functional block components and various processing steps. Such functional blocks may be realized by any number of hardware or software components configured to perform the specified functions and achieve the various results of the present invention. For example, the present invention may employ various light sensors such as avalanche photodiode detectors, focal plane arrays, or simple photodiodes, which may carry out a variety of functions. The present invention may be practiced in conjunction with any number of electromagnetic radiation detecting systems to detect radiation within the visible, the infrared, the terahertz, and the like wavebands. Also, the radiation detecting systems may be practiced among various applications, such as a seeker for a laser guided projectile, including bombs, projectiles, missiles, and the like. The radiation detecting systems may also be practiced among other applications, such as a digital camera, or an optical positioning sensor, such as those used in robotics, etc. Further, the present invention may employ any number of conventional techniques for sensing an electromagnetic signal, responding to an electromagnetic radiation signal, focusing and/or defocusing an electromagnetic radiation, and the like. The system described is merely one exemplary application for the invention.

Figure 1:
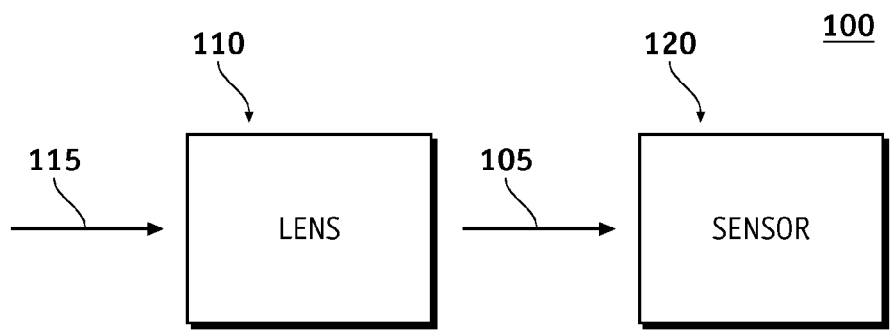
FIG. 1 representatively illustrates a block diagram for a negative index metamaterial optical focusing system, according to an embodiment of the present invention.

Various representative embodiments of the present invention may be applied to any system for focusing light. Certain representative embodiments may include, for example, laser guided seekers, digital camera lenses, and optical positioning sensors. In an exemplary embodiment, and with reference to FIG. 1, a light focusing system 100 may comprise a lens 110, such as an optic lens, comprising a negative index metamaterial to locus at least one selected wavelength 105. System 100 may also comprise a sensor 120 upon which the lens 110 may focus the selected wavelength 105. The selected wavelength 105 may comprise a selected wavelength from incident light 115 that may encounter lens 110. In one aspect of the invention, the system 100 may comprise lens 110 and sensor 120, wherein the selected wavelength 105 may be selectively modified. In another aspect of the invention, system 100 may comprise the lens 110 that focuses all wavelengths except a selected wavelength 105.

Figure 2:
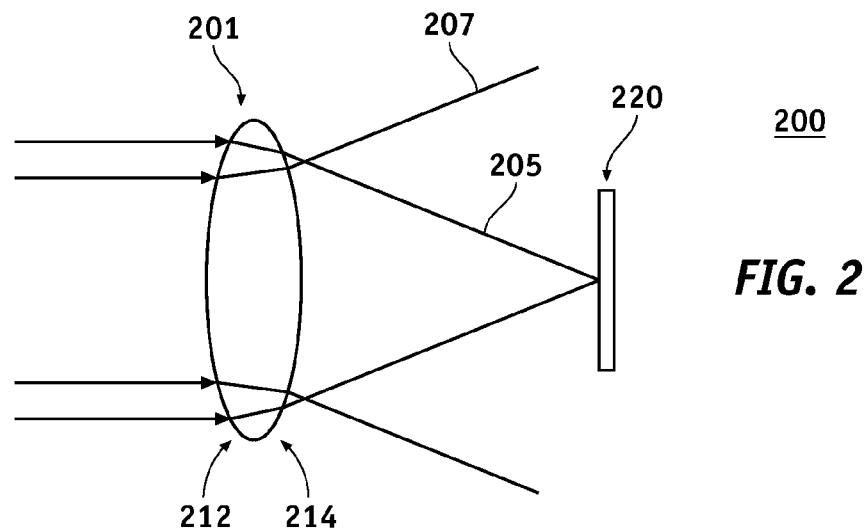
FIG. 2 representatively illustrates a lens and sensor, according to an embodiment of the present invention.

In an exemplary embodiment, a system may comprise a lens comprising any combination of at least one of a substantially concave, convex, and planar configuration on a first side, and at least one of a substantially concave, convex, and planar configuration on a second side opposite the first side. With reference to FIG. 2, in one embodiment of the present invention, a system 200 may comprise a lens 210 that may comprise a substantially convex configuration on a first side 212, and a substantially convex configuration on a second side 214 opposite the first side 212. This configuration is often referred to as a biconvex lens or a doubly convex lens. In one embodiment, the lens 210 may focus negatively refracted wavelengths 207 away from a sensor 220 and focus positively refracted wavelengths 205 towards the sensor 220.

Figure 3:
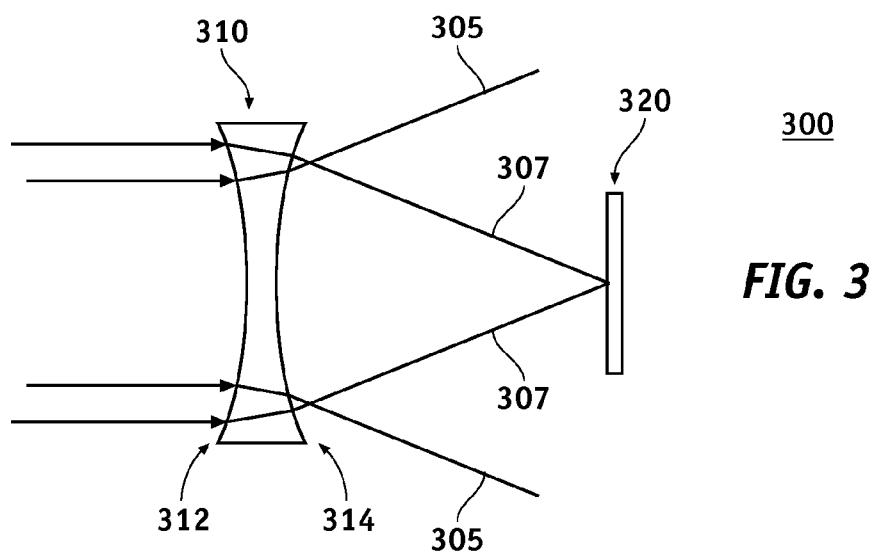
FIG. 3 representatively illustrates a lens and sensor, according to another embodiment of the present invention.

In another exemplary embodiment, and with reference to FIG. 3, a system 300 may comprise a lens 310 that may comprise a substantially concave configuration on a first side 312, and a substantially concave configuration on a second side 314 opposite the first side 312. This configuration is often referred to as a biconcave lens or a doubly concave lens. In one embodiment, the lens 310 may focus negatively refracted wavelengths 307 onto a sensor 320 while deflecting positively refracted wavelengths 305 away from the sensor 320.

Figure 4:
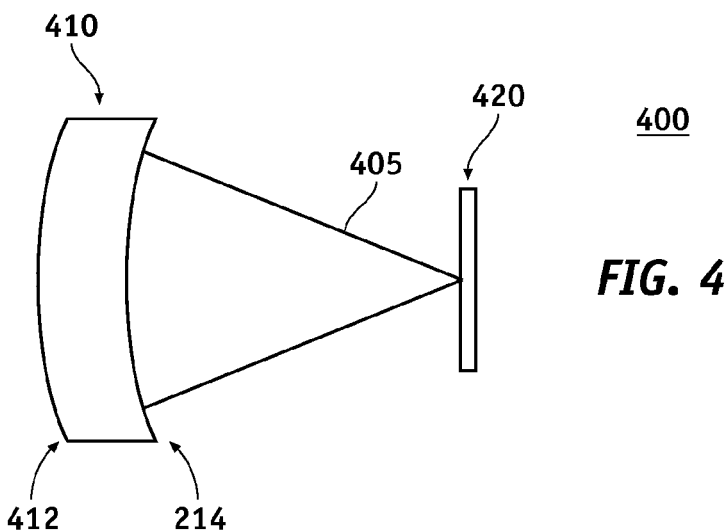
FIG. 4 representatively illustrates a lens and sensor, according to another embodiment of the present invention.

In still yet another exemplary embodiment, and with reference to FIG. 4, a system 400 may comprise a lens 410 that may comprise a substantially convex configuration on a first side 412, and a substantially concave configuration on a second side 414. The system 400 may also comprise a sensor 420 upon which a selected wavelength 405 may be focused. Biconvex lens 210, biconcave lens 310, and lens 410 merely comprise examples of lens configurations according to the present invention, and other embodiments may also be used. For example, multi-faceted lenses, variable shape lenses, and the like may be used.

Figure 5:
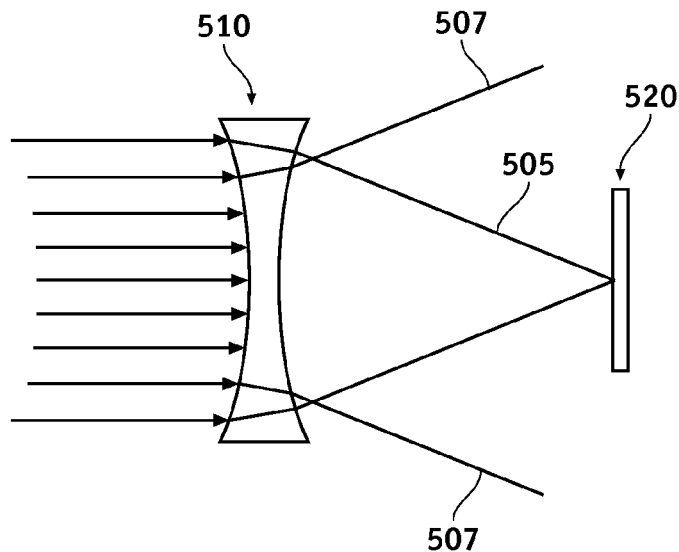
FIG. 5 representatively illustrates a lens and sensor, according to the embodiment of FIG. 3.

In an embodiment of the present invention, and with reference to FIG. 5, an exemplary lens 510 may comprise a negative index metamaterial to focus (converge) a selected wavelength 505 upon a sensor 520 by a negative index, while the lens 510 may also refract a non-selected wavelength 507 away (diverge) from sensor 520 by a positive index. In one aspect of the present invention, the selected wavelength 505 may comprise a near infrared wavelength, but selected wavelength 505 may comprise any electromagnetic radiation wavelength or range of wavelengths along the electromagnetic radiation spectrum that is desired, for example, visible, ultraviolet, microwave, terahertz, etc. Moreover, the non-selected wavelength 507 may comprise solar wavelengths, but non-selected wavelength 507 may comprise any other electromagnetic radiation that is undesired.

In accordance with the present invention, a lens comprising the negative index metamaterial may be shaped in any manner that may locus the desired wavelength onto a sensor while deflecting unwanted wavelengths away from the sensor. The shape of the lens may determine the direction that the wavelengths will be refracted and the lens may be any shape that may achieve the desired operation. In accordance with exemplary embodiments of the present invention, a lens comprising negative index metamaterial focuses or defocuses selected wavelengths or range of wavelengths. In an embodiment, the lens may not absorb wavelengths as in typical electromagnetic filters, but rather may defocus (deflect) the selected wavelengths.

In accordance with the present invention, the various lenses described may comprise any material, such as plastics, liquids, glasses, composites and the like, or any combination of such materials that may comprise negative index metamaterials to focus or defocus selected wavelengths. In an embodiment, any combination of transparent materials may comprise refractive indices differing by a factor of 2 or 3 from one another. The lenses may comprise materials that may comprise a negative index of refraction and/or a positive index of refraction, depending on the frequency of the wavelength. For example, the lens may comprise a metamaterial that may refract selected wavelengths of light by both a negative index of refraction as well as a positive index of refraction. The wavelengths may refract, positively or negatively, based upon the composition and structure of the metamaterial. Metamaterials may be constructed to possess a negative index of refraction, see "Near-Infrared Double Negative Index Metamaterials," Optics Express Vol. 13 No. 13, 2005.

In accordance with the present invention, the structure of a metamaterial may be altered by exposing the metamaterial to: an electromagnetic field, a mechanical pressure, a laser perpendicular to the material, or any other force that may be able to alter the metamaterial structure either mechanically, electrically or chemically. By designating the wavelengths that may be refracted negatively, such as a selected bandwidth and/or a center frequency, a lens may be configured to focus predetermined values of wavelengths. Changing the structure of the metamaterial may also create a component that operates similarly to a bandpass or notch filter. In one aspect of the present invention, the bandwidth may be altered by a metamaterial altering mechanism, and the altering may occur either before or after installation in a device, such as a laser guided seeker, or even during using of the device. Thus, the ease at which the bandwidth may be altered, may allow for the sun and/or known countermeasure signals to be removed (defocused) from the electromagnetic radiation signal.

In accordance with an exemplary embodiment, a system for optical focusing negative index metamaterial may also comprise a sensor. As described briefly, the sensor detects the electromagnetic wavelengths focused upon it by a lens comprising the negative index metamaterial. The sensor may then convert the detected wavelengths into an electronic signal that may be used for further processing. Any type of sensor may be employed by the system, for example, avalanche photodiode detectors, focal plane arrays, or simple photodiodes, and the like. The sensor may be positioned proximate the lens to directly receive the focused electromagnetic waves, but other configurations may comprise other components between the lens and the sensor to carry out the various functions of the invention.

Figure 6:
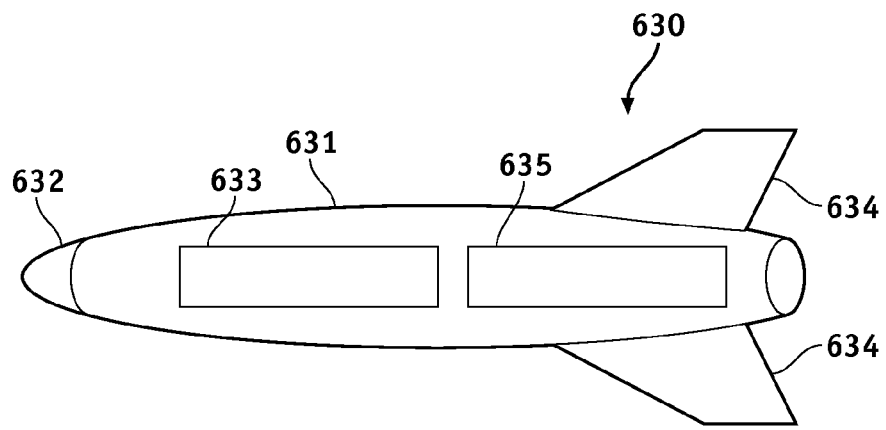
FIG. 6 representatively illustrates a laser guided projectile, according to an embodiment of the present invention.

In accordance with an exemplary embodiment, the systems for optical focusing negative index metamaterial may comprise a light focusing system as described and may comprise at least one component of a device, such as a laser guided seeker. The system for laser guided seekers may operate in conjunction with a laser guided projectile. According to an exemplary embodiment of the present invention and with reference to FIG. 6, in general, a laser guided projectile 630 may comprise: a shell 631, a laser guided seeker 632, an onboard computer 633, a set of control surfaces 634, and a warhead 635. The shell 631 may house the components that operate the laser guided projectile 630. The laser seeker 632 may detect a laser light source reflected off of a target, and the laser seeker 632 may produce a signal that indicates where the light source may be. The onboard computer 633 may process inputs and may provide outputs to maneuver the projectile 630 by orienting the control surfaces 634. The onboard computer 633 may direct the control surfaces 634 based upon the signal from the seeker 632, and may assist with navigating the projectile 630 towards the target. The onboard computer 633 may also comprise a strap down or gimbaled inertial measurement unit. The onboard computer 633 may be electrically connected to the seeker 632 and the control surfaces 634. The warhead 635 may comprise the lethal payload that detonates when the projectile 630 intercepts the target. Projectile 630 may also comprise other components, systems, and devices, to carry out the functions of a laser guided projectile.

Figure 7:
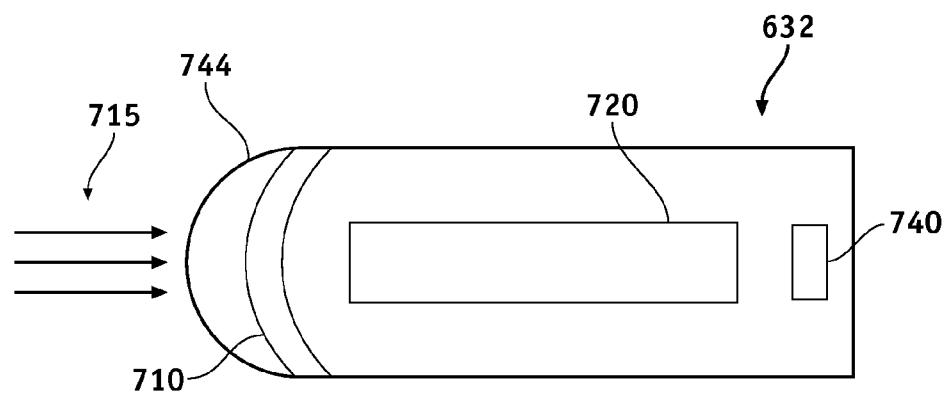
FIG. 7 representatively illustrates a laser seeker of the laser guided projectile, according to the embodiment of the present invention.

In an exemplary embodiment, and with reference to FIG. 7, the laser guided seeker 632 may comprise a focusing lens 710, comprising negative index metamaterial, and a sensor 720. The focusing lens 710 may focus noise away from the sensor 720 while focusing the desired signal onto the sensor 720. The focusing lens 710 may be located between the electromagnetic radiation source 715 and the sensor 720. The sensor 720 in this exemplary embodiment may be a focal plane array, it may, however, be any sensor, for example, an avalanche photodiode detector to convert an optical signal into an electrical signal. The sensor 720 may be coupled electrically to the onboard computer 633. In addition, the laser guided seeker 632 may also comprise additional components, such as a protective cover 744 or an altering device 746. The protective cover 744 may surround the focusing lens 740 to protect it from damage due to hail, rocks, birds, etc. The altering device 746 may optimize aerodynamic flow, and/or transmit one or more wavelengths.

Figure 8:
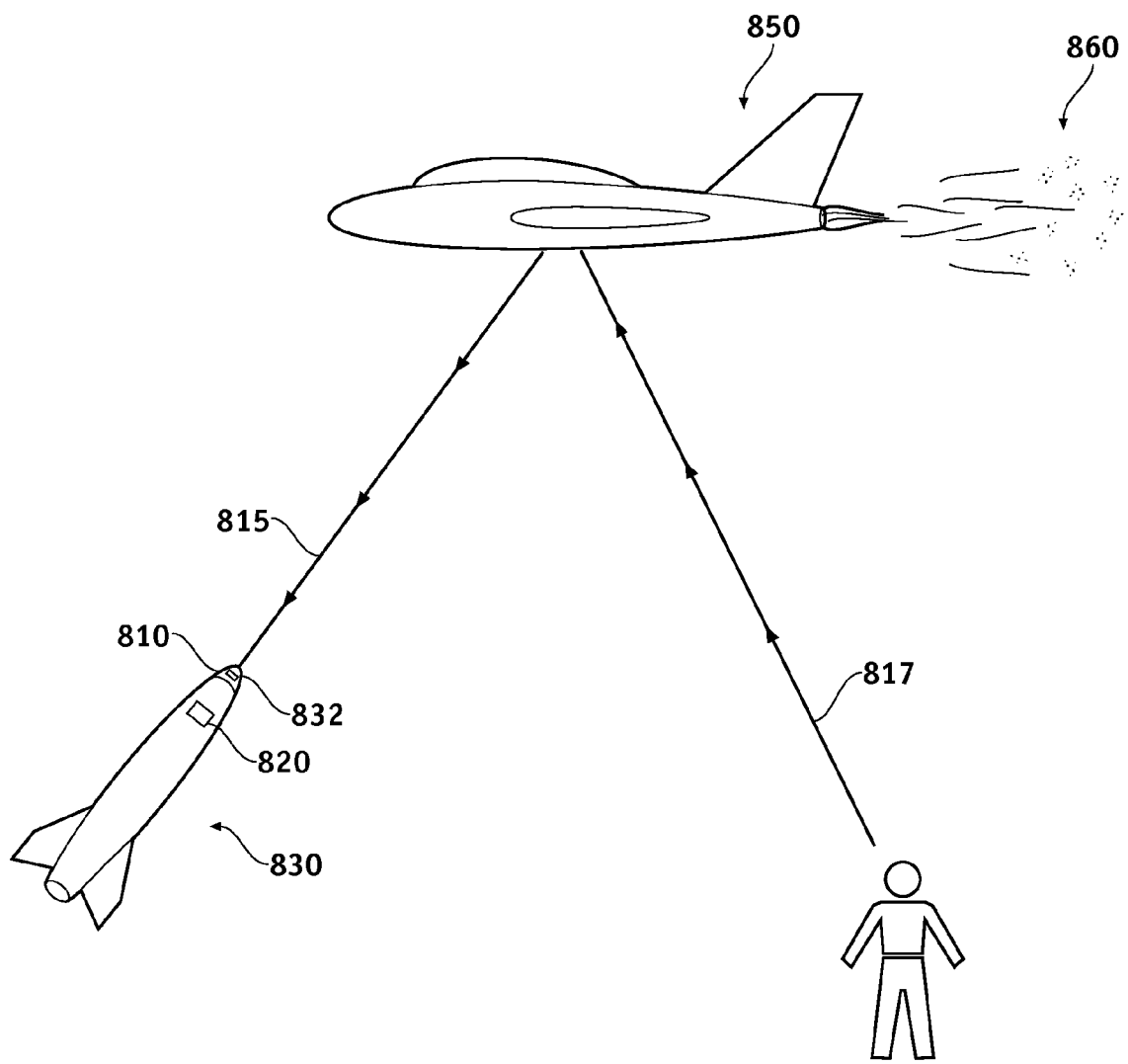
FIG. 8 representatively illustrates a laser guided projectile, according to an embodiment of the present invention.

In accordance with an exemplary embodiment, and with reference to FIG. 8, a system comprising negative index metamaterial for focusing and sensing electromagnetic radiation may operate as follows. A laser guided seeker 832, as part of a laser guided projectile 830 may sense electromagnetic radiation in any form, such as infrared light, visible light, ultraviolet light, a laser, a microwave beam, or even a radar signal. In the present embodiment, the seeker 832 senses a reflected laser 815 to facilitate the laser guided projectile 830 to accurately strike a target 850. In one embodiment, the focusing lens 810 may act as a notch filter by defocusing all other wavelengths. The laser guided projectile 830 may locate the target 850 by sensing only the electromagnetic radiation signal 815 reflected from a laser designator 817 off of the target 850. The projectile 830, thus, does not "lock" onto any countermeasures 860 that may be deployed by the target 850 and/or the sun. The focusing lens 810 of seeker 832, comprising negative index metamaterial, focuses the electromagnetic radiation and/or deflects known noise sources within a predetermined bandwidth, such as the wavelengths of countermeasures 860 deployed to confuse the seeker 832. The focusing lens 810 may act as a notch filter and the noise wavelengths from the countermeasures 860 are refracted negatively, whereas the signal wavelengths from the reflected laser 815 are refracted positively; the positively refracted wavelengths are refracted towards a sensor 820, and the negatively refracted wavelengths are deflected away from the sensor 820.

Figure 9:
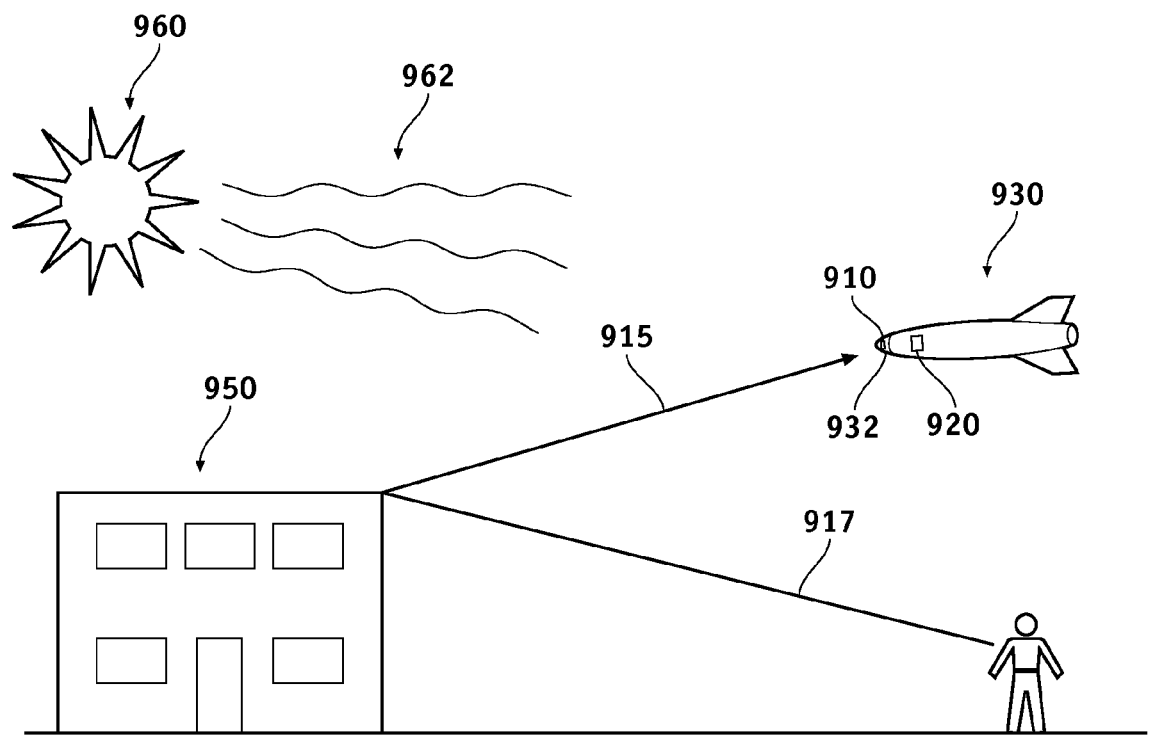
FIG. 9 representatively illustrates a laser guided projectile, according to another embodiment of the present invention.

In another exemplary embodiment and with reference to FIG. 9, a focusing lens 910, as part of a seeker 932, may act as a bandpass filter. A laser guided projectile 930, comprising the seeker 932, may locate a target 950 by sensing only an electromagnetic radiation signal 915 reflected from a laser designator 917 and does not "lock" onto to any electromagnetic radiation 962 reflecting from the sun 960 in the background of the target 950. The focusing lens 910 may focus the electromagnetic radiation signal 915 by negatively refracting the electromagnetic radiation signal 915, within a predetermined bandwidth, towards a sensor 920 while positively refracting all other wavelengths away from a sensor 920. After the focusing lens 910 focuses the electromagnetic radiation, the focused electromagnetic radiation may be focused onto the sensor 920. Only the correct signal may be exposed to the sensor 920, which then may allow a seeker 932 to more accurately locate the target 950, and prevent the seeker 932 from locking onto radiation 962 from the sun 960.

Figure 10:
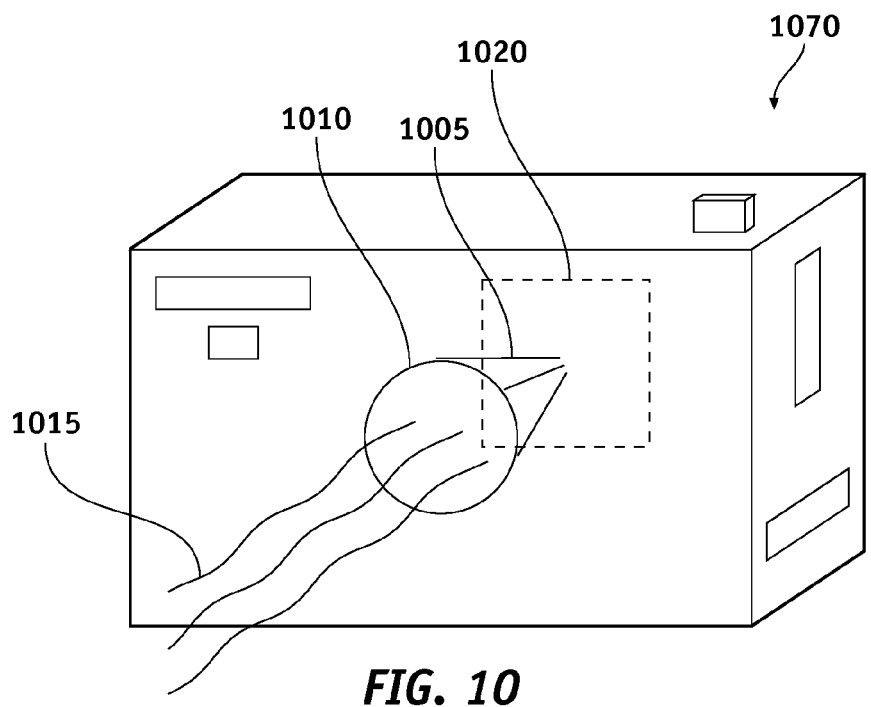
FIG. 10 representatively illustrates a digital camera, according to an embodiment of the present invention.

In accordance with an exemplary embodiment, and with reference to FIG. 10, another system comprising negative index metamaterial for focusing and sensing electromagnetic radiation may comprise a digital camera. A digital camera device 1070 may comprise a lens 1010 and a light sensor 1020. The lens 1010 may act as any typical camera lens to receive light 1015 from an image to be photographed, i.e. digitally rendered, but consistent with the present invention, the lens 1010 may comprise of a negative index metamaterial to selectively focus particular wavelengths 1005, such as laser beams intended to saturate the camera receiver.

Figure 11:
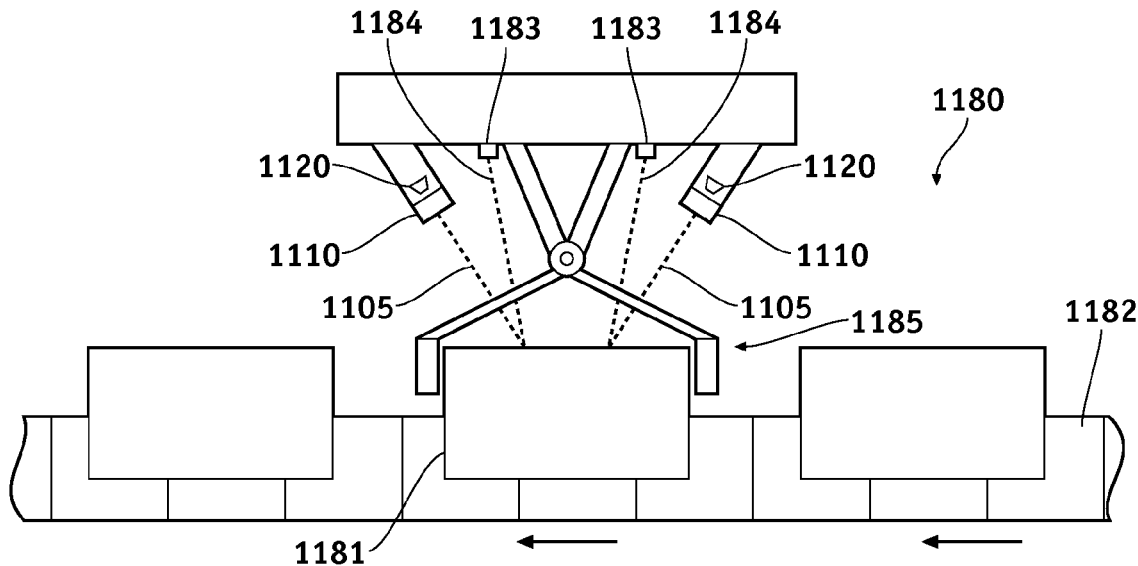
FIG. 11 representatively illustrates an optical positioning system, according to an embodiment of the present invention.

In accordance with another exemplary embodiment, and with reference to FIG. 11, another system comprising negative index metamaterial for focusing and sensing electromagnetic radiation may comprise an optical positioning system 1180. In this embodiment, a lens 1110 may focus a reflected laser 1105 upon a sensor 1120 to assist with providing positional information of a good 1181 during production, for example, the good 1181 upon a conveyor belt 1182. A laser transmitter 1183 emits a laser light 1184 that may be reflected by the good 1181 as it moves along on conveyor belt 1182. The reflected laser 1105 is received by the lens 1110, focused upon the sensor 1120, which may then provide information to facilitate coordinated movement by a good transfer mechanism 1185. This embodiment is merely one example of an optical positioning system, and other optical positioning systems may benefit from the present invention.

Figure 12:
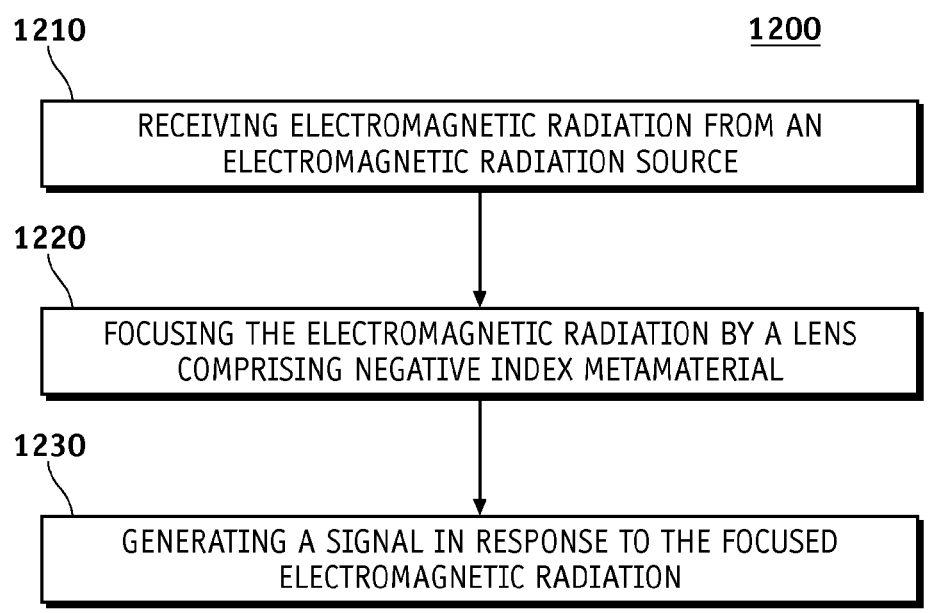
FIG. 12 representatively illustrates a method for using an optical focusing system comprising a negative index metamaterial, according to an embodiment of the present invention.

In accordance with an exemplary embodiment and with reference to FIG. 12, a method 1200 for detecting an electromagnetic radiation source comprises: receiving electromagnetic radiation from an electromagnetic radiation source (1210); focusing the electromagnetic radiation by a lens comprising a negative index metamaterial (1220), and generating a signal in response to the focused electromagnetic radiation (1230). In this embodiment, receiving electromagnetic radiation from the electromagnetic radiation source (1210) may comprise receiving the electromagnetic radiation source by lenses comprising a negative index metamaterial, and sensors as described in the present invention. Focusing the electromagnetic radiation by a lens comprising a negative index metamaterial (1220) may comprise focusing the electromagnetic radiation by lenses as described by the present invention. Moreover, generating a signal in response to the focused electromagnetic radiation (1230) may comprise signal generation by sensors as described by the present invention.

In the foregoing specification, the invention has been described with reference to specific exemplary embodiments. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

As used herein, the terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

The invention claimed is:

1. A light focusing system comprising:
   a sensor; and
   a lens comprising a negative index metamaterial adapted to:
      filter out a selected wavelength from a range of electromagnetic radiation sensed by the lens;
      focus the selected wavelength onto the sensor; and
      divert the remaining ranged of sensed electromagnetic radiation away from the sensor.

2. The system of claim 1, wherein the lens can be selectively modified to filter a desired selected wavelength.

3. The system of claim 1, wherein the lens comprises a substantially convex configuration on a first side and a substantially convex configuration on a second side opposite the first side.

4. The system of claim 1, wherein the lens comprises a substantially concave configuration on a first side and a substantially concave configuration on a second side opposite the first side.

5. The system of claim 1, wherein the lens comprises at least one of a substantially concave, convex, and planar configuration on a first side, and at least one of a substantially concave, convex, and planar configuration on a second side opposite the first side.

6. The system of claim 1, wherein the lens refracts by a negative index the single selected wavelength, and the lens refracts by a positive index the remaining range of sensed electromagnetic radiation.

7. The system of claim 6, wherein the remaining range of sensed electromagnetic radiation comprises solar wavelengths.

8. The system of claim 1, wherein the selected wavelength comprises a near infrared wavelength.

9. The system of claim 1, wherein the light focusing system comprises at least one component of a laser guided seeker.

10. The system of claim 1, wherein the negative index metamaterial comprises one of a liquid, glass, plastic, metal, and composite.

11. A projectile comprising a laser seeker, comprising:
   a lens to receive electromagnetic radiation, wherein the lens comprises a negative index metamaterial for:
      refracting by a negative index a first portion of the electromagnetic radiation;
      focusing the first portion of the electromagnetic radiation; and
      refracting by a positive index a second portion of the electromagnetic radiation; and
   a sensor disposed proximate to the lens for receiving the focused first portion of the electromagnetic radiation, wherein the sensor generates a signal in response to the focused first portion of the electromagnetic radiation.

12. The system of claim 11, wherein the lens comprises a substantially convex configuration on a first side and a substantially convex configuration on a second side opposite the first side.

13. The system of claim 11, wherein the lens comprises a substantially concave configuration on a first side and a substantially concave configuration on a second side opposite the first side.

14. The system of claim 11, wherein the lens comprises at least one of a substantially concave, convex, and planar configuration on a first side, and at least one of a substantially concave, convex, and planar configuration on a second side opposite the first side.

15. The system of claim 11, wherein the electromagnetic radiation comprises wavelengths selected from the group of infrared, visible, ultraviolet and terahertz.

16. The system of claim 11, wherein the negative index metamaterial comprises at least one of a liquid, glass, plastic, metal, and composite.

17. A method for detecting an electromagnetic radiation source, comprising:
   sensing a range of electromagnetic radiation from the electromagnetic radiation source;
   filtering the electromagnetic radiation with a lens comprising negative index metamaterial onto a sensor, wherein the lens is adapted to:
      filter out a single selected wavelength from a range of electromagnetic radiation sensed by the lens;
      focus the single selected wavelength onto the sensor; and
      divert the remaining sensed electromagnetic radiation away from the sensor; and
   generating a signal in response to the focused electromagnetic radiation.

18. The method of claim 17, wherein the lens comprises a substantially convex configuration on a first side and a substantially convex configuration on a second side opposite the first side.

19. The method of claim 17, wherein the lens comprises a substantially concave configuration on a first side and a substantially concave configuration on a second side opposite the first side.

20. The method of claim 17, wherein the lens comprises at least one of a substantially concave, convex, and planar configuration on a first side, and at least one of a substantially concave, convex, and planar configuration on a second side opposite the first side.

21. The method of claim 17, wherein the electromagnetic radiation comprises wavelengths selected from the group of infrared, visible, ultraviolet and terahertz.

22. The method of claim 17, wherein the negative index metamaterial comprises at least one of a liquid, glass, plastic, metal, and composite.

* * * * *